United States Patent Office 2,835,410
Patented May 20, 1958

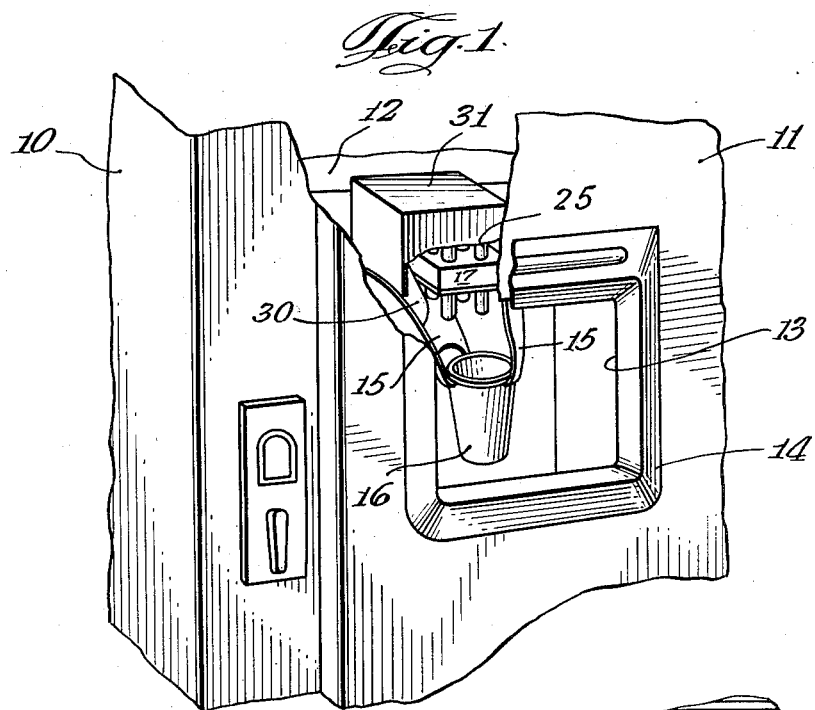
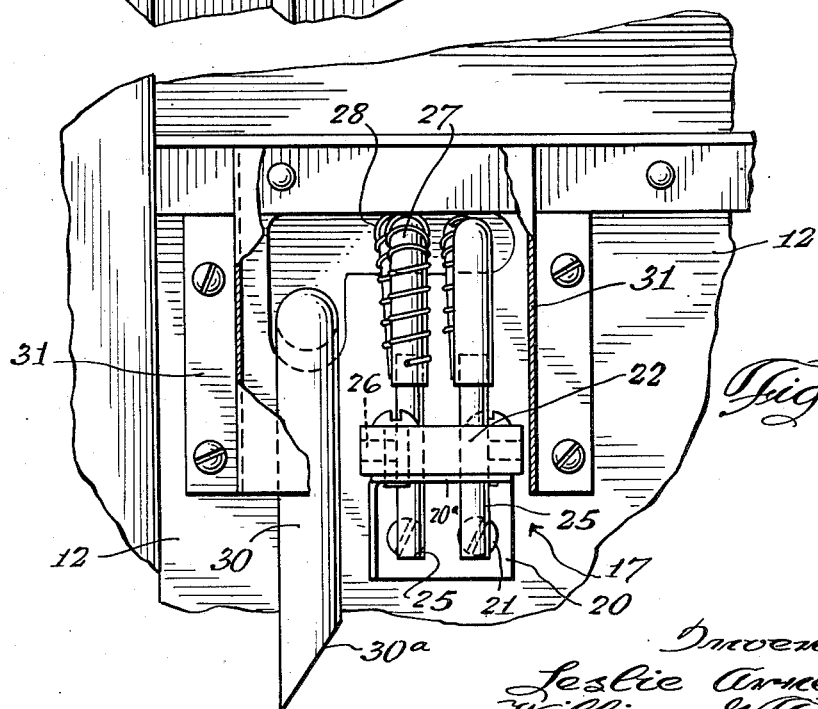

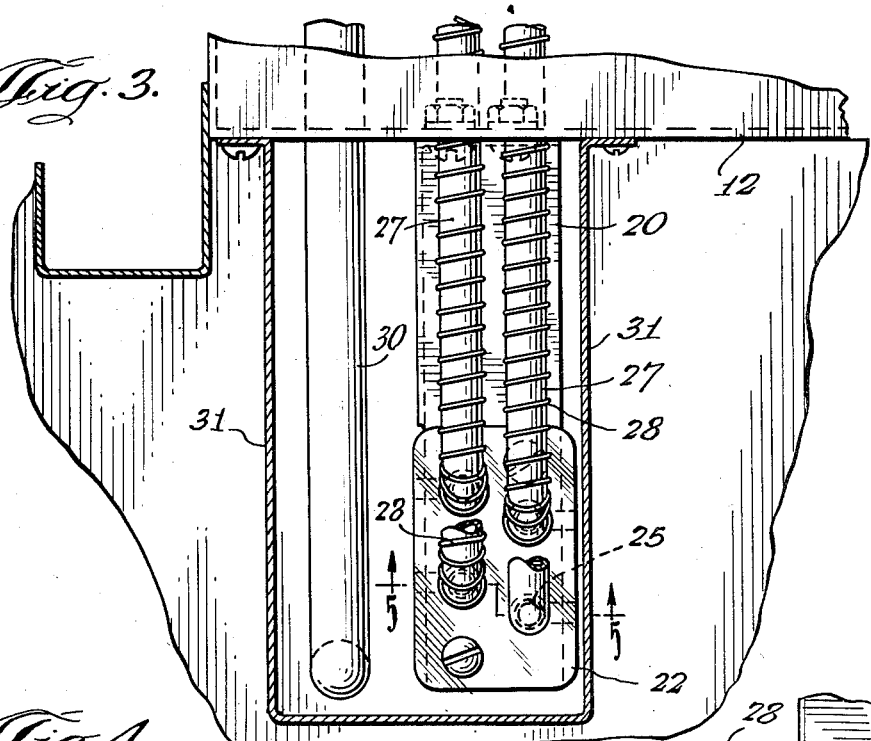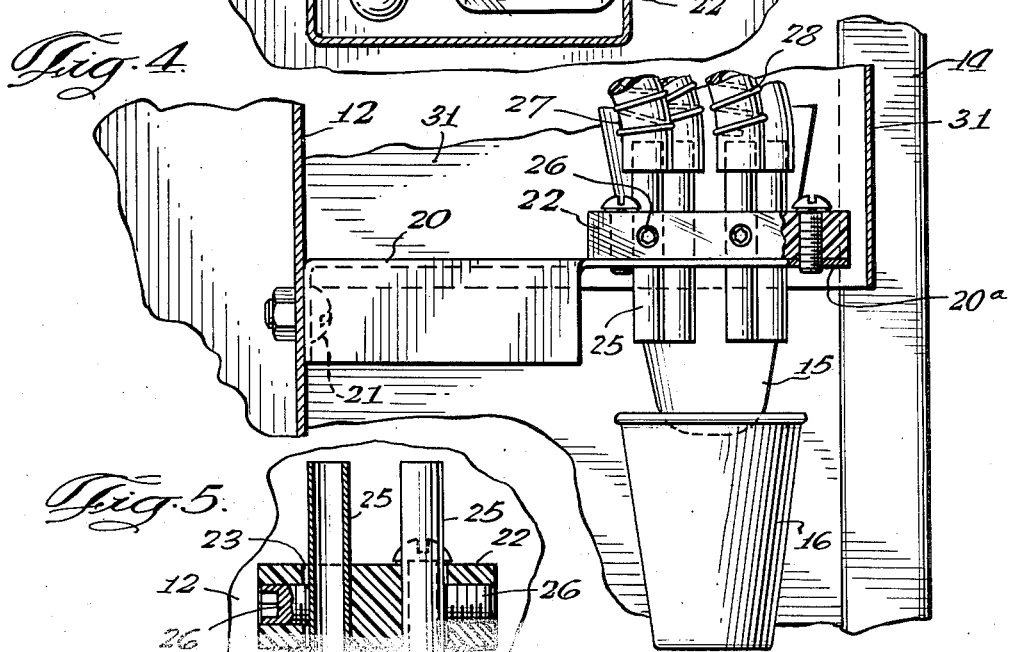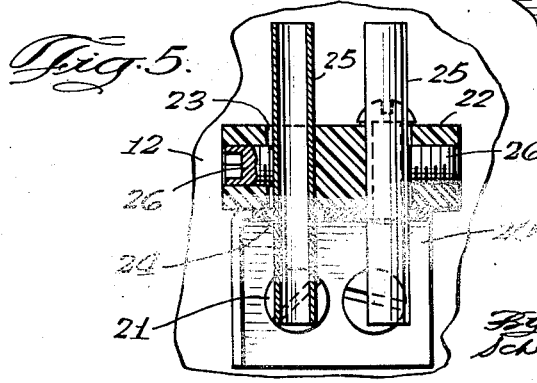

2,835,410

BEVERAGE DISPENSING APPARATUS

Leslie Arnett and William G. Freise, Chicago, Ill., assignors to Square Manufacturing Company, a corporation of Illinois Application May 9, 1955, Serial No. 506,732

4 Claims. (Cl. 222—129.1)

This invention is concerned with an improvement in automatic beverage dispensing apparatus and more particularly with an improved nozzle unit for directing various liquid ingredients into a cup or other container in which they mix, forming a beverage.

One feature of the invention is the provision in a beverage dispensing apparatus wherein a plurality of liquid beverage ingredients are delivered separately through conduits to a container in which they mix, of a nozzle unit comprising a support member, a plurality of nozzles one connected to each of the conduits and securing means attaching the nozzles to the support member and permitting adjustment of the position of the nozzles. Another feature is that the nozzles are individually removable permitting cleaning thereof. A further feature is that the nozzles project generally vertically through a support block and are adjustably positioned therein by set screws. Yet another feature is that a guard member encloses part of the nozzle unit including a portion of each of the nozzles and the conduits attached thereto.

Further features and advantages will readily be apparent from the following specification and from the drawings, in which:

Figure 1 is a fragmentary perspective view of the door of a beverage dispensing machine with a portion broken away showing the nozzle arrangement;

Figure 2 is a front elevation view of the nozzle unit with a portion of the guard member broken away;

Figure 3 is a top plan view of the nozzle unit;

Figure 4 is a side elevation of the nozzle unit; and

Figure 5 is a vertical sectional view taken along line 5—5 of Figure 3.

In beverage dispensing machines wherein liquid beverage ingredients are delivered to a container in which they mix, generally a cup positioned in or movable to a service opening from which the the customer may remove the cup, it is necessary that the ingredient handling elements, the conduits, nozzles and the like be accessible and preferably removable from the machine so that they may be washed periodically. This is particularly true in those machines which prepare beverages from concentrated flavored syrups, as syrup tends to be sticky and to foul the tubing after a period of use. In addition, it is desirable that the nozzles from which the ingredients are delivered to the mixing container or cup be adjustable to provide some degree of control over the manner of mixing and to prevent splashing of the ingredients during dispensing.

Turning now to Figure 1 of the drawings, a portion of a cabinet 10 having a door 11 is shown. Arranged within the cabinet is a refrigerated compartment 12 which may contain supplies of various flavored syrups, a water cooler and a carbonator. Also arranged in the cabinet 10 may be other elements of the system, as a water pump, a refrigerating system for compartment 12, a supply of cups and a control mechanism which on selection of a desired drink and deposit of the necessary coins into the machine by the customer will effect dispensing of the desired drink. Further details of such a machine may be found in Arnett and Freise application, Serial No. 487,834, filed February 14, 1955.

Included in door 11 is an access opening 13 surrounded by a decorative bezel 14. Within service opening 13 and mounted on the rear surface of door 11 are a plurality of cup supporting fingers 14 which hold a cup 16 in position to be filled and from which the cup may be removed by the customer. A nozzle unit indicated generally as 17 is mounted on the front surface of refrigerated housing 12 and extends forwardly therefrom, projecting into the service opening above cup 16.

As shown in Figures 2, 3 and 4, the nozzle unit includes a bracket 20 secured to the wall of housing 12 by bolts 21 and carrying at its outer end a plastic block 22. The plastic block is disposed in a generally horizontal plane and spaced above cup 16, carried by fingers 15, and is provided with a plurality of apertures 23 extending generally vertically therethrough. These apertures are in register with apertures 24 in the projecting end portion 20a of bracket 20 which underlies the plastic block.

A plurality of nozzles 25, preferably short lengths of stainless steel or aluminum tubing, extend generally vertically through apertures 23 and 24 and are secured therein by set screws 26, one for each nozzle, carried in transverse threaded openings in the plastic block.

Secured to the upper end of each of the nozzles 25 is a flexible plastic conduit 27 through which the beverage ingredients are delivered from supplies contained in refrigerated housing 12. In the embodiment of the invention shown there are four nozzles and conduits provided, three being for flavored syrups and the fourth for plain water. Coil springs 28 are placed around conduits 27 to prevent kinking thereof.

Extending from the interior of the refrigerated compartment 12, alongside nozzle 17 is a larger plastic delivery tube 30 for carbonated water. The carbonated water delivery tube has its open end cut off at an angle as shown at 30a, on the side adjacent the open ends of nozzles 25 to prevent splashing and to promote mixing of carbonated water with the flavored syrups.

By loosening set screws 26 the nozzles 25 may individually and independently be adjusted vertically with respect to cup 16, controlling the point at which the ingredient discharged therefrom strikes the side of the cup, providing the desired mixing action with a minimum of plashing. The conduits 27 may be slipped off the upper ends of tubes 35 and the tubes removed from the machine for periodic cleaning.

A generally rectangular guard 31, which forms four sides of a box, is carried on the front wall of compartment 12 and surrounds the top surface of bracket 20, supporting block 22, the upper portions of nozzles 25, supply conduits 27 and carbonated water supply tube 30a. The guard member has round corners and covers the sharp corners of the nozzle unit so that a serviceman will not injure himself while working on the machine. The guard also prevents the serviceman from accidentally disturbing the connection and adjustment of the conduits and nozzle tubes.

While we have shown and described certain embodiments of our invention, it is to be understood that it is capable of many modifications. Changes therefore, in the construction and arrangement may be made without departing from the spirit and scope of the invention as disclosed in the appended claims.

We claim:

1. In a beverage dispensing apparatus including a cabinet with a door having a service opening wherein a cup is positioned for filling with one or more of a plurality of liquid beverage ingredients which are delivered through conduits to the cup wherein they mix forming a beverage, a nozzle unit of the character described, comprising: a nozzle support member mounted in the interior of the cabinet and projecting into said service opening; a plurality of nozzles one connected to each of said conduits; and securing means attaching said nozzles to said support member, said securing means permitting individual adjustment of said nozzles with respect to said cup.

2. Beverage dispensing apparatus of the character described in claim 5, wherein a guard member encloses part of the nozzle unit including an upper portion of each of said nozzles and the conduits attached thereto with the nozzles each having a lower discharge end extending to below the guard.

3. In a beverage dispensing apparatus including a cabinet with a door having a service opening wherein a cup is positioned for filling with one or more of a plurality of liquid beverage ingredients which are delivered through conduits to the cup wherein they mix forming a beverage, a nozzle unit of the character described, comprising: a bracket mounted in the interior of the cabinet; a nozzle support member carried by the bracket and projecting toward said service opening, said member comprising a block having a plurality of apertures therethrough and positioned in a generally horizontal plane above a cup in said service opening; a plurality of nozzles readily removably connected to said conduits, carried in the apertures in said block and extending therefrom on either side thereof, there being one nozzle for each of said conduits; and individually adjustable set screws carried by said block, one set screw projecting into each of said apertures and securing each of said nozzles therein, permitting individual adjustment and removal thereof.

4. In a beverage dispensing apparatus including a cabinet with a door having a service opening wherein a cup is positioned for filling with one or more of a plurality of liquid beverage ingredients, liquid supply means of the character described, comprising: a refrigerated compartment within said cabinet and adapted to contain liquid beverage ingredients, said compartment having a front wall positioned adjacent said service opening; a bracket mounted on the front wall of said compartment; a nozzle support block carried by said bracket and projecting into said service opening, above a cup positioned therein, said block having a plurality of generally vertically extending apertures therein; a plurality of nozzles carried in the apertures in said block and extending on either side thereof; a plurality of beverage ingredient supply conduits extending from within said refrigerated compartment and readily removably connected to the tops of said nozzles; a plurality of set screws, one for each of said nozzles, securing said nozzles in said block and permitting individual vertical adjustment and removal thereof; a carbonated water supply conduit extending within said compartment alongside said bracket and support member and terminating above said cup adjacent the lower ends of said nozzles; and a guard member enclosing the upper portion of said bracket, support block, the upper portions of said nozzles and the liquid supply conduits.

References Cited in the file of this patent

UNITED STATES PATENTS

| | | |
|---|---|---|
| 1,261,986 | White | Apr. 9, 1918 |
| 2,066,169 | Zwosta | Dec. 29, 1936 |
| 2,462,019 | Bowman | Feb. 15, 1949 |
| 2,715,484 | Alexander | Aug. 16, 1955 |